(12) United States Patent
Ikeda

(10) Patent No.: US 12,011,767 B2
(45) Date of Patent: Jun. 18, 2024

(54) CUTTING INSERT, CUTTING TOOL, AND METHOD FOR MANUFACTURING MACHINED PRODUCT

(71) Applicant: KYOCERA CORPORATION, Kyoto (JP)

(72) Inventor: Yoshihito Ikeda, Ritto (JP)

(73) Assignee: KYOCERA Corporation, Kyoto (JP)

( * ) Notice: Subject to any disclaimer, the term of this patent is extended or adjusted under 35 U.S.C. 154(b) by 44 days.

(21) Appl. No.: 16/635,166

(22) PCT Filed: Jul. 24, 2018

(86) PCT No.: PCT/JP2018/027742
§ 371 (c)(1),
(2) Date: Jan. 30, 2020

(87) PCT Pub. No.: WO2019/026698
PCT Pub. Date: Feb. 7, 2019

(65) Prior Publication Data
US 2021/0016360 A1    Jan. 21, 2021

(30) Foreign Application Priority Data

Aug. 2, 2017   (JP) ................................. 2017-149840
Aug. 30, 2017  (JP) ................................. 2017-164974

(51) Int. Cl.
*B23B 27/14*   (2006.01)
*B23B 27/16*   (2006.01)

(52) U.S. Cl.
CPC ........ *B23B 27/145* (2013.01); *B23B 27/1603* (2013.01); *B23B 2200/083* (2013.01); *B23B 2200/201* (2013.01); *B23B 2200/3672* (2013.01)

(58) Field of Classification Search
CPC .... B23B 2200/3672; B23B 2200/3654; B23B 2200/3645; B23B 2200/201;
(Continued)

(56) References Cited

U.S. PATENT DOCUMENTS 3,786,541 A * 1/1974 Lundgren ............. B23B 27/143
407/116
4,318,645 A * 3/1982 McCreery ............. B23B 27/143
407/114
(Continued)

FOREIGN PATENT DOCUMENTS

DE     4314570 A1 * 11/1994 ........... B23B 27/143
DE    19856931 A1 *  6/2000 ........... B23B 27/141
(Continued)

OTHER PUBLICATIONS

Detailed Description JP61159341A (translation): obtained at https://dialog.proquest.com/professional/cv_2183530/lookuppatent?accountid=131444 (last visited May 5, 2022).*
(Continued)

*Primary Examiner* — Ryan Rufo
(74) *Attorney, Agent, or Firm* — VIERING, JENTSCHURA & PARTNER MBB

(57) ABSTRACT

A cutting insert may include a first surface, a second surface, a third surface, and a land surface. The first surface may include a first corner and a first side. The land surface may be located between the first surface and the third surface. The land surface may include a first land surface connecting to the first corner, and a second land surface connecting to the first side. A width of the first land surface in a front view as viewed from a side of the first surface may be a first width, the first width at an end portion on a side of the second land surface may be larger than the width at a part connecting to a midportion of the first corner.

6 Claims, 20 Drawing Sheets

(58) Field of Classification Search
CPC . B23B 27/145; B23B 27/141; B23B 27/1603;
B23B 27/1611; B23B 27/1622; B23B
27/164; B23B 27/1651; B23B 2200/242;
B23B 2200/245; B23B 2200/24; B23B
2200/3663; B23B 27/143; B23C
2200/366; B23C 2200/201; B23C
2200/365; B23C 2200/243
See application file for complete search history.

(56) References Cited

U.S. PATENT DOCUMENTS

| | | | | |
|---|---|---|---|---|
| 4,340,324 | A * | 7/1982 | McCreery | B23B 27/145 |
| | | | | 407/114 |
| 5,771,763 | A * | 6/1998 | Naslund | B23B 27/145 |
| | | | | 407/113 |
| 6,786,682 | B1 * | 9/2004 | Wiman | B23B 27/143 |
| | | | | 407/114 |
| 10,040,125 | B2 * | 8/2018 | Matsuda | B23B 27/143 |
| 11,077,502 | B2 * | 8/2021 | Sakai | B23B 27/1611 |
| 2002/0127068 | A1 * | 9/2002 | Kinukawa | B23B 27/145 |
| | | | | 407/113 |
| 2006/0188347 | A1 | 8/2006 | Kratz | |
| 2006/0228179 | A1 | 10/2006 | Alm et al. | |
| 2008/0292415 | A1 * | 11/2008 | Kuroda | B23D 35/002 |
| | | | | 407/61 |
| 2012/0170987 | A1 * | 7/2012 | Komatsuka | B23B 27/141 |
| | | | | 407/114 |
| 2013/0064613 | A1 * | 3/2013 | Krishtul | B23B 27/143 |
| | | | | 407/114 |
| 2013/0236257 | A1 * | 9/2013 | Nada | B23B 27/141 |
| | | | | 407/114 |
| 2015/0078844 | A1 * | 3/2015 | Majima | B23B 27/143 |
| | | | | 407/114 |
| 2015/0283617 | A1 * | 10/2015 | Nagarajan | B23B 27/143 |
| | | | | 407/114 |
| 2015/0375303 | A1 * | 12/2015 | Fujii | B23B 27/143 |
| | | | | 82/1.11 |
| 2016/0297010 | A1 | 10/2016 | Kukino et al. | |
| 2017/0225243 | A1 * | 8/2017 | Matsumura | B23C 5/202 |
| 2017/0320143 | A1 * | 11/2017 | Lof | B23B 27/145 |
| 2018/0161886 | A1 | 6/2018 | Hasegawa | |

FOREIGN PATENT DOCUMENTS

| | | | | | |
|---|---|---|---|---|---|
| JP | 61159341 | A | * | 7/1986 | ........... B23B 27/145 |
| JP | 61219503 | A | * | 9/1986 | |
| JP | 61219503 | A | * | 9/1986 | |
| JP | H02139003 | U | | 11/1990 | |
| JP | H02139004 | U | | 11/1990 | |
| JP | 2002046002 | A | | 2/2002 | |
| WO | 2006091141 | A1 | | 8/2006 | |
| WO | 2012023325 | A1 | | 2/2012 | |
| WO | WO-2012023325 | A1 | * | 2/2012 | ........... B23B 27/145 |
| WO | 2016043127 | A1 | | 3/2016 | |
| WO | 2016189935 | A1 | | 12/2016 | |

OTHER PUBLICATIONS

Description DE19856931A1 (translation) obtaiend at https://worldwide.espacenet.com/ (last visited Sep. 14, 2022).*
DE 19856931 A1 Human Translation.*

* cited by examiner

CUTTING INSERT, CUTTING TOOL, AND METHOD FOR MANUFACTURING MACHINED PRODUCT

CROSS-REFERENCE TO RELATED APPLICATIONS

This application is a national stage entry according to 35 U.S.C. 371 of PCT Application No. PCT/JP2018/027742 filed on Jul. 24, 2018, which claims priority to Japanese Application No. 2017-149840 filed on Aug. 2, 2017, and Japanese Application No. 2017-164974 filed on Aug. 30, 2017, which are entirely incorporated herein by reference.

TECHNICAL FIELD

The present disclosure generally relates to cutting inserts for use in a cutting process. More specifically, the present disclosure relates to cutting tools composed of a material whose hardness is relatively high, such as PCD and cBN.

BACKGROUND

As a cutting tool used in a cutting process of a workpiece such as metal, for example, a cutting insert is discussed in WO 2016/043127 (Patent Document 1). Patent Document 1 discusses the cutting insert may include a nose rounded part cutting edge located on a nose rounded part of an upper surface, and a straight cutting edge located on a side of the upper surface. The cutting insert may include negative lands of unequal width disposed between a rake surface on the upper surface and a flank surface on a side surface.

SUMMARY

A cutting insert in a non-limiting embodiment may include a first surface, a second surface, a third surface and a land surface. The first surface may have a polygonal shape and may include a first corner and a first side extended from the first corner. The second surface may be located on a side opposite to the first surface. The third surface may be located between the first surface and the second surface. The land surface may be located between the first surface and the third surface.

The land surface may include a first land surface connecting to the first corner, and a second land surface connecting to the first side. A width of the first land surface in a front view as viewed from a side of the first surface may be referred to as a first width, the first width at an end portion on a side of the second land surface may be larger than the first width at a part connecting to a midportion of the first corner.

DETAILED DESCRIPTION

Figure 1:
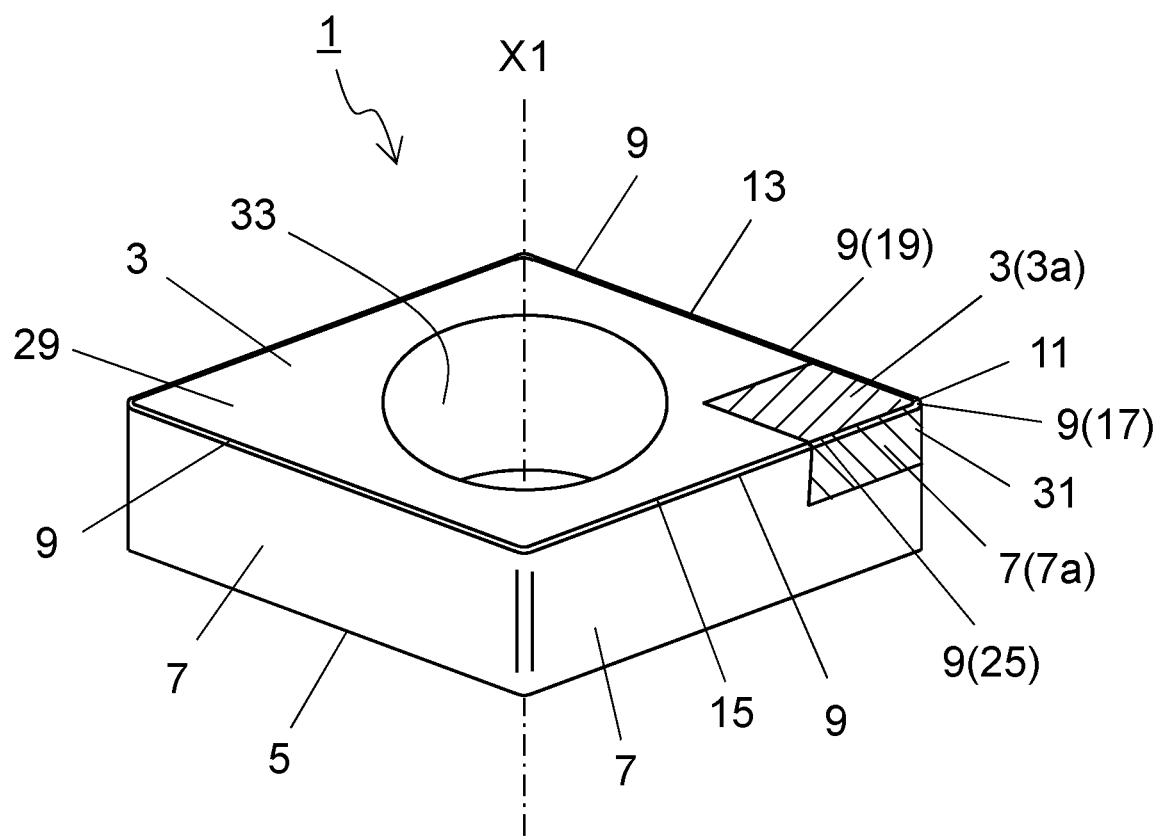
FIG. 1 is a perspective view illustrating a cutting insert in a non-limiting embodiment.

Cutting inserts 1 (hereinafter also referred to simply as "the inserts 1") in non-limiting embodiments may be described in detail below with reference to the drawings. For convenience of description, the drawings referred to in the following illustrate, in simplified form, only main members necessary for describing non-limiting embodiments. The inserts may be therefore capable of including any arbitrary structural member not illustrated in the drawings referred to. Dimensions of the members in each of the drawings are ones which faithfully represent neither dimensions of actual structural members nor dimension ratios of these members.

<Cutting Inserts>

The insert 1 in a non-limiting embodiment may have an approximately polygonal plate shape and may include a first surface 3 (an upper surface in FIG. 1), a second surface 5 (a lower surface in FIG. 1), a third surface 7 (a side surface in FIG. 1), and a land surface 9.

The first surface 3 may have a polygonal shape as illustrated in FIG. 1. The second surface 5 may be located on opposite side of the first surface 3 as illustrated in FIG. 1. The third surface 7 may be located between the first surface 3 and the second surface 5 as illustrated in FIG. 1. The land surface 9 may be located between the first surface 3 and the third surface 7 as illustrated in FIG. 1. The insert 1 may also include a cutting edge located on at least a part of a ridge line where the land surface 9 intersects with the third surface 7 in a non-limiting embodiment.

Figure 2:
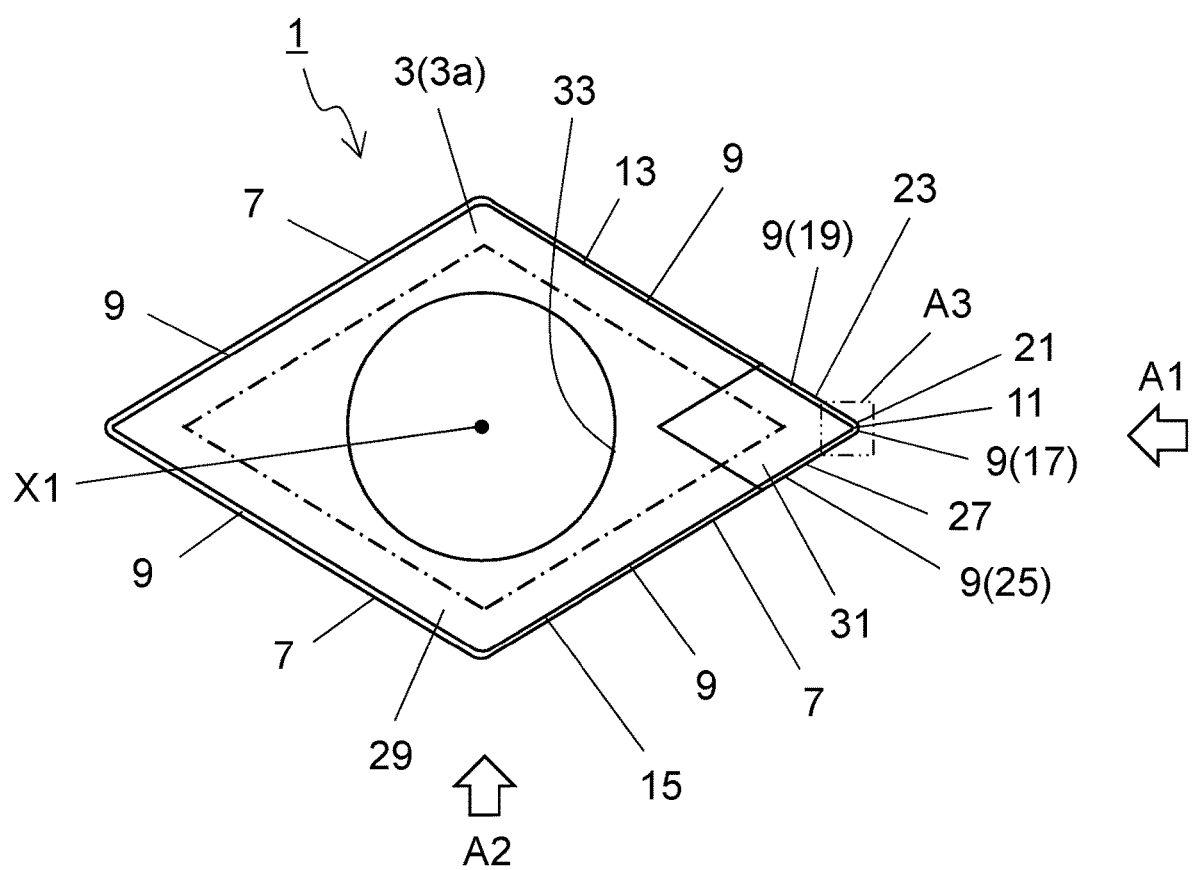
FIG. 2 is a front view of the cutting insert illustrated in FIG. 1 as viewed from a side of a first surface.

An outer peripheral edge of the first surface 3 in the non-limiting embodiment illustrated in FIG. 1 may have a polygonal shape, and may have a rhomboidal shape in FIG. 2. Accordingly, the first surface 3 may include four corners and four sides. In this case, one of the four corners may be referred to as a first corner 11, and two sides extended from the first corner 11 may be respectively referred to as a first side 13 and a second side 15. In other words, the first corner 11 may be located between the first side 13 and the second side 15.

The polygonal shape is not limited to a strict polygonal shape. For example, the four corners of the first surface 3 may be rounded and may have a slightly outwardly protruded shape in a front view of the first surface 3. The four sides are not limited to a strict straight line shape in a plan view of the first surface 3. These sides may have an outwardly slightly protruded or slightly recessed shape in the plan view of the first surface 3.

The second surface 5 may have a polygonal shape. Similarly to the first surface 3, the second surface 5 may have a rhomboidal shape in a non-limiting embodiment. Accordingly, the third surface 7 may include four flat surfaces that are approximately flat, and four curved surfaces that respectively connect these flat surfaces in the non-limiting embodiment illustrated in FIG. 1.

Shapes of the first surface 3 and the second surface 5 are not limited to the above configurations. The shapes of the first surface 3 and the second surface 5 may be quadrangular shapes in the insert 1 of a non-limiting embodiment. Alternatively, the shapes of the first surface 3 and the second surface 5 may be, for example, triangular shapes or hexagonal shapes.

An imaginary flat surface orthogonal to a central axis X1 connecting a center of the first surface 3 and a center of the second surface 5 may be referred to as a reference plane X2. The second surface 5 may be a flat surface parallel to the reference plane X2 in a non-limiting embodiment.

Dimensions of the insert 1 are not particularly limited. For example, a length of one side of the first surface 3 may be set to approximately 3-20 mm. A height from the first surface 3 to the second surface 5 may be set to approximately 5-20 mm.

The land surface 9 may be a narrow-width band shaped region located along the cutting edge. The land surface 9 may connect to the cutting edge. The cutting edge may have high durability because the insert 1 includes the land surface 9. The land surface 9 may be located along the entirety of an outer periphery of the first surface 3 or, alternatively, may be located along only a part of the outer periphery of the first surface 3. Specifically, the land surface 9 may be located along only the first corner 11 on the quadrangular shaped first surface 3.

The land surface 9 may be inclined relative to the first surface 3 and the third surface 7 in the non-limiting embodiment illustrated in FIG. 1. Specifically, the land surface 9 may be inclined relative to the first surface 3 and the third surface 7 so as to approach the second surface 5 as going from a side of the land surface 9 which connects to the first surface 3 toward a side thereof which connects to the third surface 7. That is, the land surface 9 may be a so-called negative land in a non-limiting embodiment.

The first surface 3 may at least partially include a rake surface region 3a. A region in the first surface 3 which is located along the land surface 9 may correspond to the rake surface region 3a in a non-limiting embodiment. The rake surface region 3a may connect to the land surface 9. A boundary between the rake surface region 3a and other region on the first surface 3 may be indicated by a chain line in the non-limiting embodiment illustrated in FIG. 1.

The third surface 7 may at least partially include a flank surface region 7a. A region in the third surface 7 which is located along the land surface 9 may correspond to the flank surface region 7a in a non-limiting embodiment. The flank surface region 7a may connect to the land surface 9.

The land surface 9 may include a first land surface 17 and a second land surface 19 in a non-limiting embodiment. The first land surface 17 may be located along the first corner 11 on the first surface 3 and may connect to the first corner 11. The first land surface 17 may connect to the first corner 11. The second land surface 19 may be located along the first side 13 on the first surface 3 and may connect to the first side 13. The second land surface 19 may connect to the first side 13.

A width of the first land surface 17 in the front view as viewed from the side of the first surface 3 may be referred to as a first width W1. The first width W1 at an end portion on a side of the second land surface 19 may be larger than the first width W1 at a part connecting to a midportion of the first corner 11.

Specifically, a width of the first land surface 17 at the end portion on the side of the second land surface 19 (hereinafter referred to as a first end portion 17b for the sake of convenience) may be referred to as a first width W12. A width of the first land surface 17 at the part connecting to the midportion of the first corner 11 (hereinafter referred to as a midportion 17a for the sake of convenience) may be referred to as a first width W11. The first width W12 of the first land surface 17 at the first end portion 17b may be larger than the first width W11 of the first land surface 17 at the midportion 17a in the non-limiting embodiment illustrated in FIGS. 5 to 7. The first widths W11 and W12 may be illustrated in sectional views in order to facilitate visual understanding.

The first width W1 of the first land surface 17 in the front view as viewed from the side of the first surface 3 may denote a width in a direction orthogonal to a ridge line where the first surface 3 intersects with the first land surface 17 in the front view of the first surface 3.

The first end portion 17b may have a larger inclination angle relative to a feed direction of a cutting tool than the mid portion 17a during a cutting process. Consequently, chips flowing across the first end portion 17b may have a larger thickness than chips flowing across the midportion 17a, and the first end portion 17a may be therefore subjected to a large cutting load. However, the first end portion 17b may have enhanced durability and the insert 1 may have good durability because the first width W12 at the first end portion 17b is larger than the first width W11 at the midportion 17a in the insert 1 of a non-limiting embodiment.

The first width W1 of the entirety of the first land surface 17 may not be merely large but the first width W11 at the midportion 17a may be relatively small in the front view of the first surface 3. This may lead to good cutting performance of the midportion 17a. The midportion 17a may be located closer to a finished surface of a workpiece than the first end portion 17b, thereby improving surface accuracy of the finished surface.

The first width W1 of the land surface 9 indicated by a distance between the first surface 3 and the third surface 7 may be set to, for example, approximately 0.01-0.5 mm in the plan view of the first surface 3. The first width W11 of the midportion 17a on the first land surface 17 is settable to, for example, approximately 0.01-0.3 mm. The first width W12 of the first end portion 17b on the first land surface 17 is settable to, for example, approximately 0.05-0.5 mm.

The first width W12 of the first end portion 17b on the first land surface 17 may be larger than the first width W11 of the midportion 17a on the first land surface 17 in a non-limiting embodiment. Alternatively, there may be a part where the first width W1 of the first land surface 17 becomes constant as approaching the first end portion 17b from the midportion 17a in a front view of the first land surface 17 as viewed from a side of the first surface 3.

Figure 5:
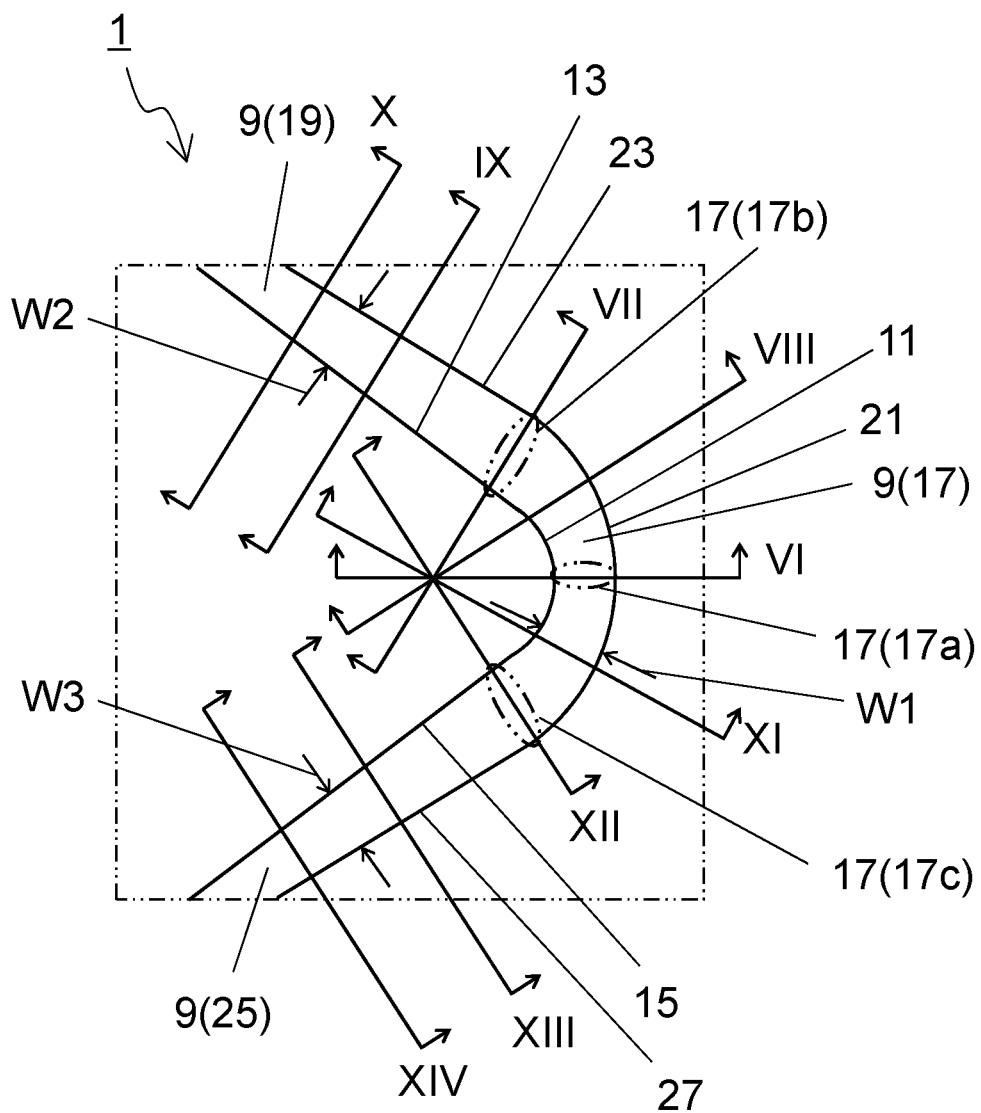
FIG. 5 is an enlarged view of a region A3 illustrated in FIG. 2.

As in the non-limiting embodiment illustrated in FIG. 5, the first land surface 17 may include a part where the first width W1 becomes larger as approaching the first end portion 17b of the first corner 11 from the midportion 17a in the front view of the first land surface 17 as viewed from the side of the first surface 3. If the first land surface 17 includes the above part, the first land surface 17 may have higher durability and further improved cutting performance.

Figure 6:
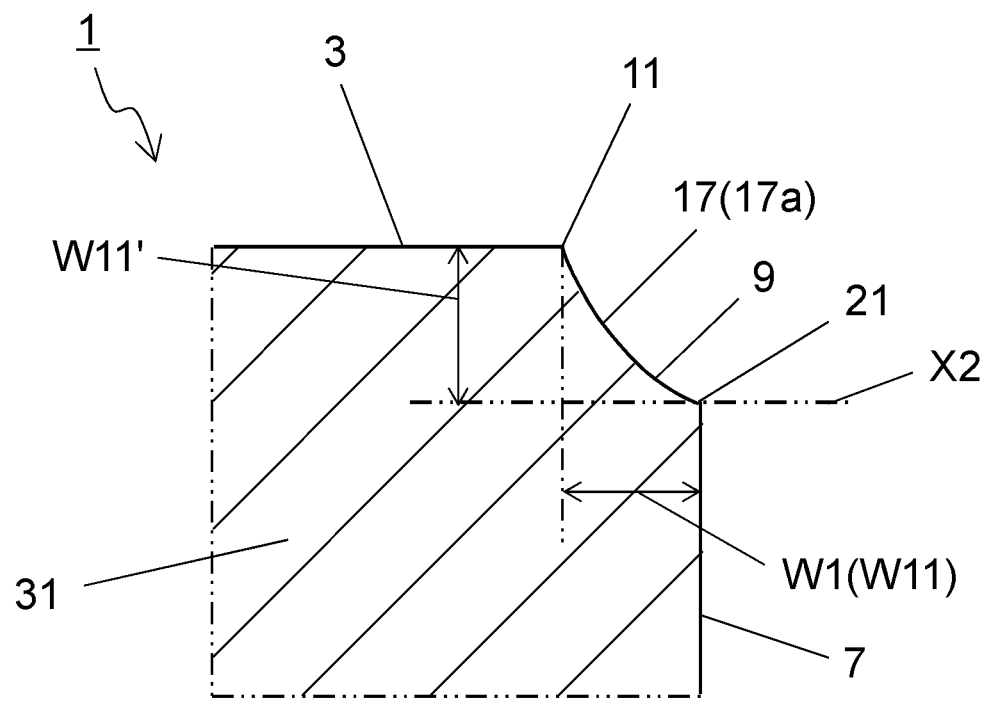
FIG. 6 is a sectional view taken along line VI-VI in the cutting insert illustrated in FIG. 5.
Figure 7:
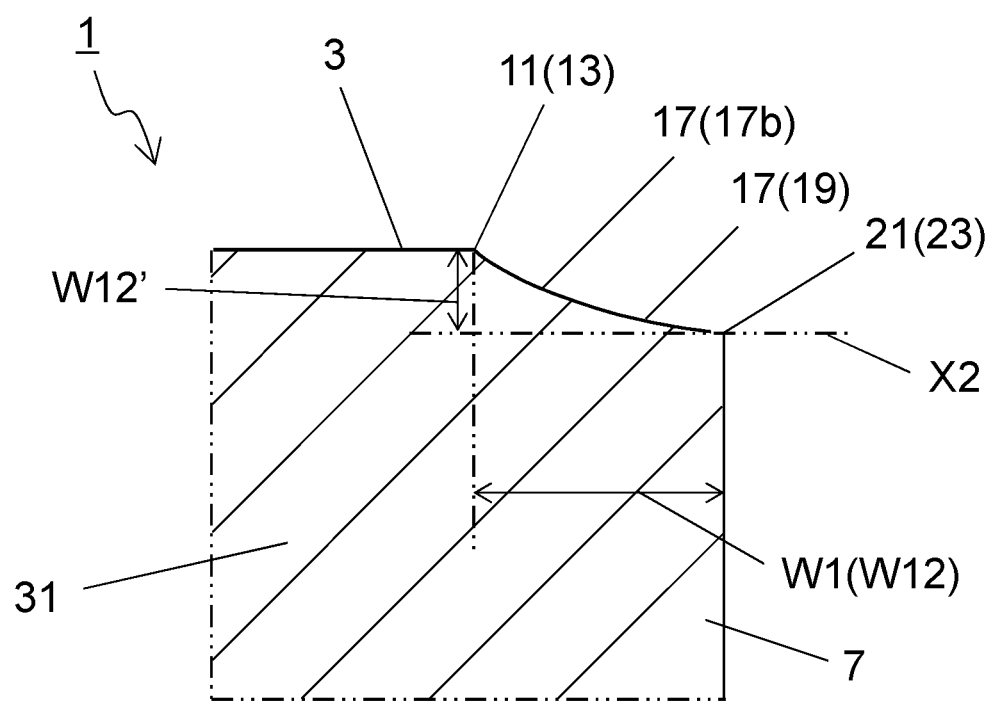
FIG. 7 is a sectional view taken along line VII-VII in the cutting insert illustrated in FIG. 5.
Figure 8:
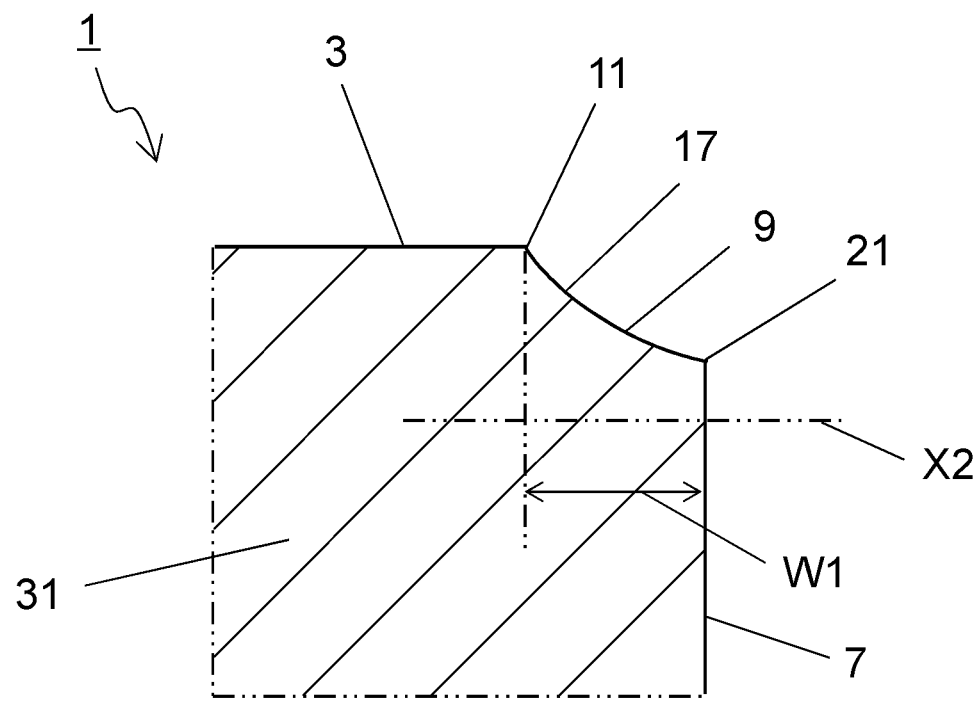
FIG. 8 is a sectional view taken along line VIII-VIII in the cutting insert illustrated in FIG. 5.

FIGS. 6 to 8 may illustrate sectional views in order to facilitate visual understanding of changes in the first width W1 of the first land surface 17 in the non-limiting embodiment illustrated in FIG. 5. The individual cross sections may illustrate the first width W1 of the first land surface 17. The W12 illustrated in FIG. 7 may be larger than the W1 illustrated in FIG. 8. The W1 illustrated in FIG. 8 may be larger than W11 illustrated in FIG. 6. As apparent from these drawings, the first width W1 of the first land surface 17 may become larger as approaching the first end portion 17b from the midportion 17a in the non-limiting embodiment illustrated in FIGS. 5 to 8.

Figure 3:
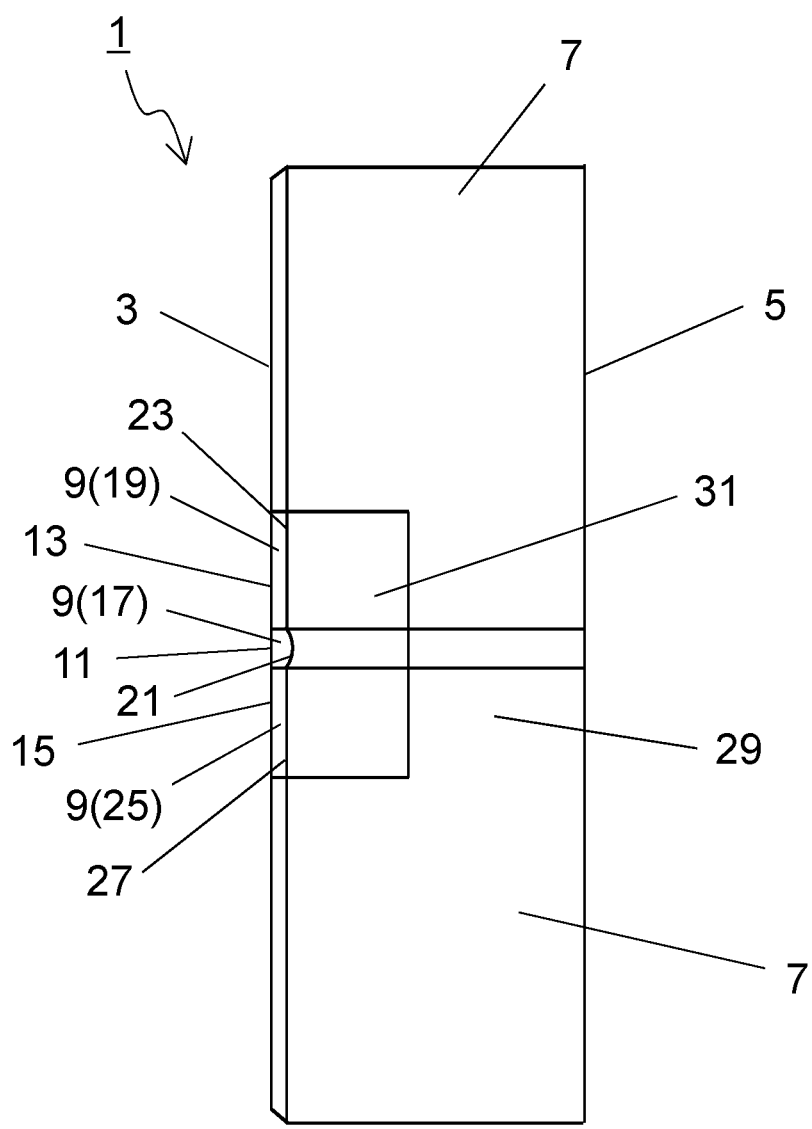
FIG. 3 is a side view of the cutting insert illustrated in FIG. 2 as viewed from direction A1.
Figure 4:
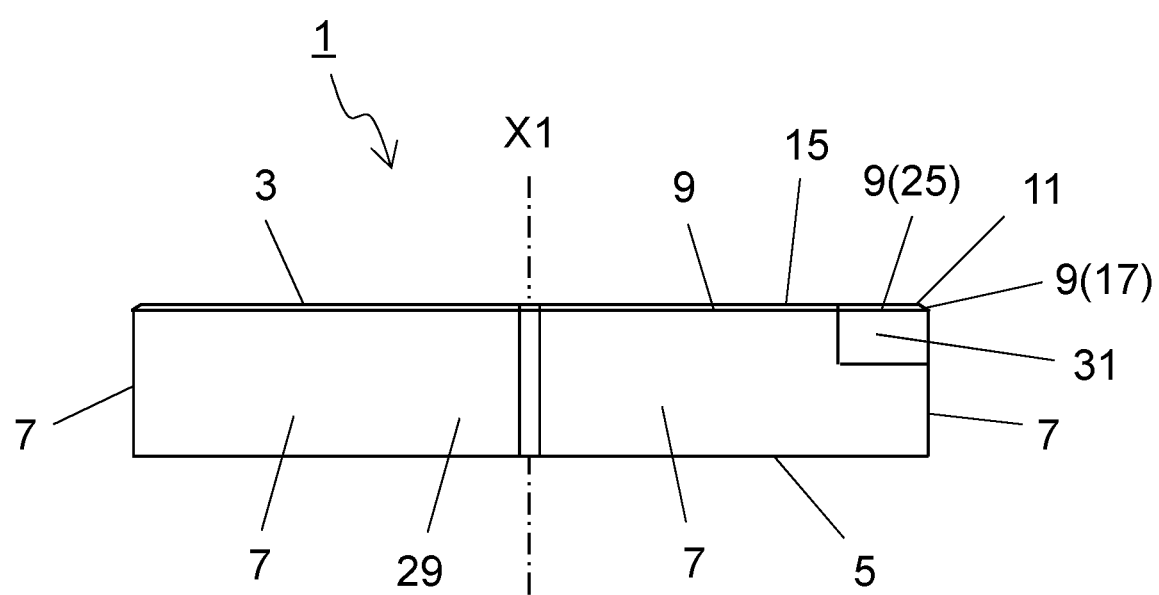
FIG. 4 is a side view of the cutting insert illustrated in FIG. 2 as viewed from direction A2.

A height of the first land surface 17 in the front view as viewed from the side of the third surface 7 may be referred to as a first height. The first height W11' at the midportion 17a may be larger than the first height W12' at the first end portion 17b as in the non-limiting embodiment illustrated in FIG. 3. If the first height of the first land surface 17 has the above configuration, the first land surface 17 may have higher durability. The reason for this may be as follows. That is, because the first height W12' at the first end portion 17b is relatively small, it may be easy to ensure a thickness of the insert 1 at the first end portion 17b susceptible to a relatively large cutting load.

As in the non-limiting embodiment illustrated in FIG. 5, the ridge line where the third surface 7 intersects with the first land surface 17 may have a curvilinear shape in the front view as viewed from the side of the first surface 3. Alternatively, the ridge line where the third surface 7 intersects with the first land surface 17 may have a circular arc shape whose radius of curvature is kept constant. Still alternatively, the ridge line where the third surface 7 intersects with the first land surface 17 may have a curvilinear shape in the front view as viewed from the side of the first surface 3. In this case, a radius of curvature at the midportion of the first corner 11 may be smaller than a radius of curvature at a part thereof including the first end portion 17b.

The cutting edge may be located on at least a part of the ridge line where the land surface 9 intersects with the third surface 7 as described above. A first cutting edge 21 may be located as a cutting edge on the ridge line where the first land surface 17 intersects with the third surface 7 in the non-limiting embodiment illustrated in FIG. 5. A second cutting edge 23 may be also located as a cutting edge on the ridge line where the second land surface 19 intersects with the third surface 7.

The ridge line where the first land surface 17 intersects with the third surface 7 and where the first cutting edge 21 is located may have a circular arc shape whose radius of curvature is kept constant in the front view as viewed from the side of the first surface 3 in the non-limiting embodiment illustrated in FIG. 5. This may make it easier to avoid local concentration of a cutting load applied to the first cutting edge 21, leading to high durability of the first cutting edge 21.

The ridge line where the first surface 3 intersects with the first land surface 17 may have a curvilinear shape such that a radius of curvature at the midportion of the first corner 11 is smaller than a radius of curvature at the part including the first end portion 17b. Hence, the first cutting edge 21 may have the high durability, and the first width W12 at the first end portion 17b may be larger than the first width W11 at the midportion 17a as described above.

The land surface 9 may include a second land surface 19 connecting to the first side 13 in the non-limiting embodiment illustrated in FIG. 5. A width of the second land surface 19 in the front view as viewed from the side of the first surface 3 may be referred to as a second width W2. The second land surface 19 may include a part where the second width W2 becomes smaller as going away from the first land surface 17. The insert 1 may have higher durability if the second land surface 19 has the above part. In particular, if the second cutting edge 23 is used as a main cutting edge, the second cutting edge 23 may be used as a main cutting edge, the main cutting edge subjected to the relatively large cutting load may have high durability.

In cases where the second land surface 19 includes a part where the second width W2 becomes smaller as going away from the first land surface 17, the second land surface 19 may further include a part where the second width W2 is kept constant.

Figure 9:
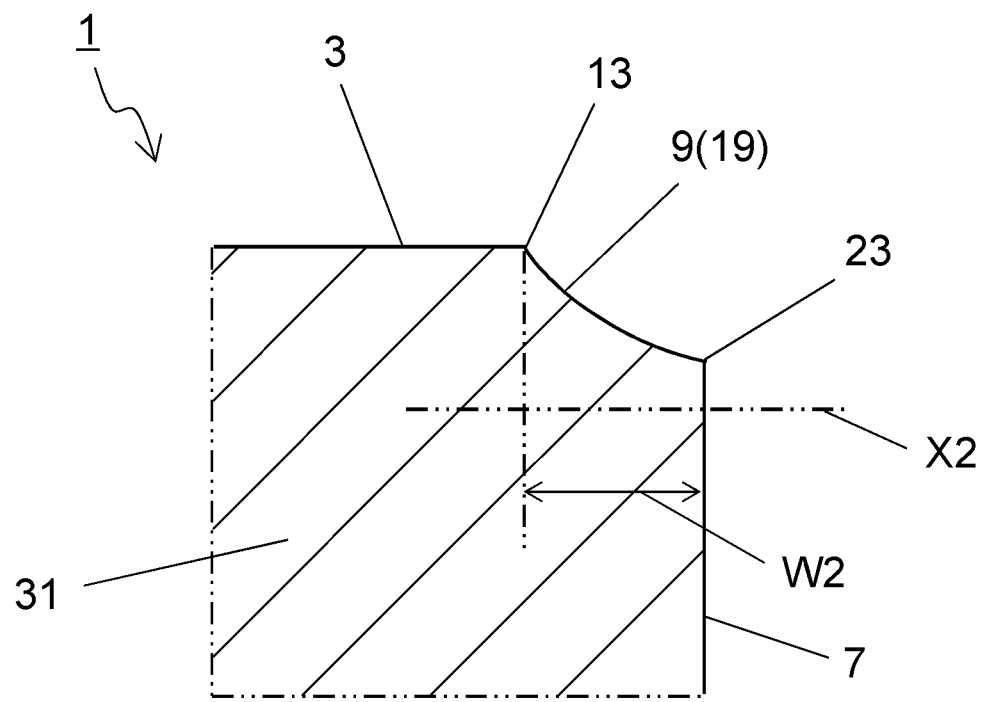
FIG. 9 is a sectional view taken along line IX-IX in the cutting insert illustrated in FIG. 5.
Figure 10:
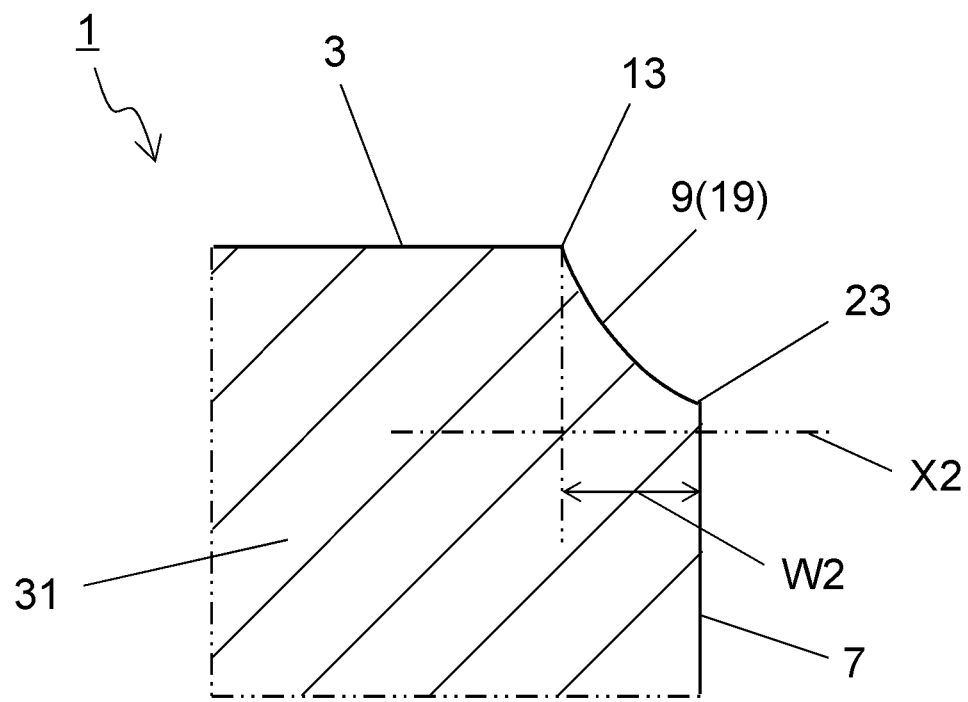
FIG. 10 is a sectional view taken along line X-X in the cutting insert illustrated in FIG. 5.

FIGS. 7, 9 and 10 may illustrate sectional views in order to facilitate visual understanding of changes in the second width W2 of the second land surface 19 in the non-limiting embodiment illustrated in FIG. 5. The individual cross-sections may illustrate the second width W2 of the second land surface 19. The W2 illustrated in FIG. 9 may be larger than the W2 illustrated in FIG. 10.

As apparent from these drawings, the second land surface 19 may include the part where the second width W2 becomes smaller as going away from the first land surface 17 in the non-limiting embodiment illustrated in FIG. 5. The cross section illustrated in FIG. 7 may be a cross section on a boundary between the first land surface 17 and the second land surface 19.

The land surface 9 may further include a third land surface 25 which is located along the second side 15 on the first surface 3 and may connect to the second side 15 as in the non-limiting embodiment illustrated in FIG. 5. A third cutting edge 27 may be located as a cutting edge on a ridge line where the third land surface 25 intersects with the third surface 7 in the non-limiting embodiment illustrated in FIG. 5.

As in the non-limiting embodiment illustrated in FIG. 5, the first width W13 at an end portion on a side of the second land surface 19 (hereinafter referred to as a second end portion 17c for the sake of convenience) may be larger than the first width W11 at the part connecting to the midportion of the first corner 11 in the front view of the first land surface 17 as viewed from the side of the first surface 3.

In cases where the first land surface 17 has the above configuration, the first land surface 17 may also have high durability and good cutting performance if a ridge line where a part located from the midportion 17a to the second end portion 17c on the first land surface 17 intersects with the third surface 7 is used as a cutting edge. That is, it is possible to use for both so-called right-handed cutting tool and left-handed cutting tool. The insert 1 may be therefore excellent in economical efficiency.

Figure 11:
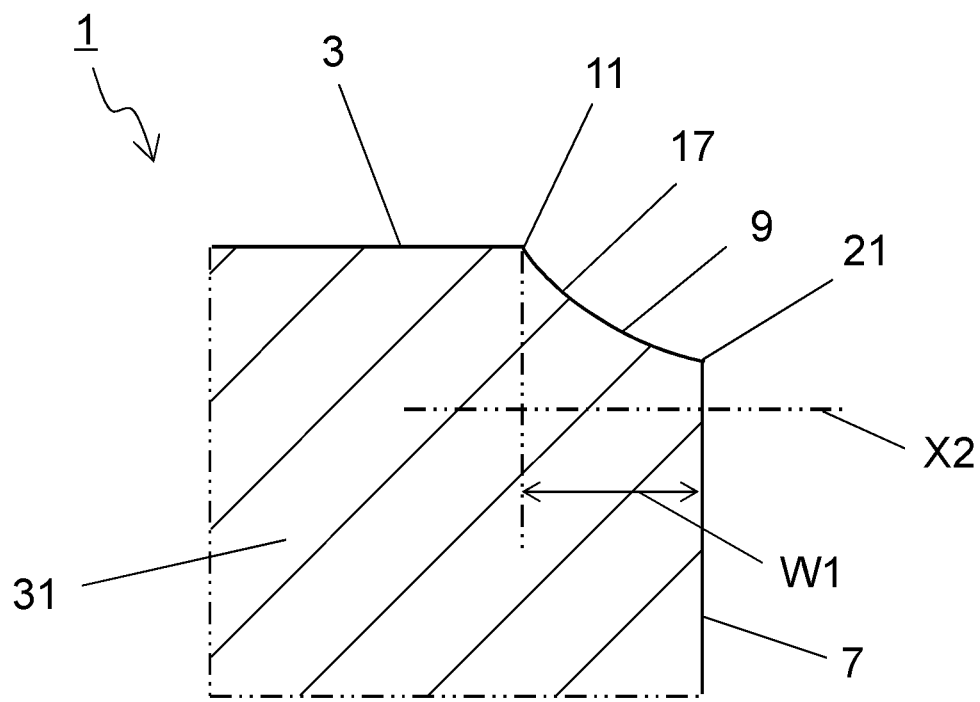
FIG. 11 is a sectional view taken along line XI-XI in the cutting insert illustrated in FIG. 5.
Figure 12:
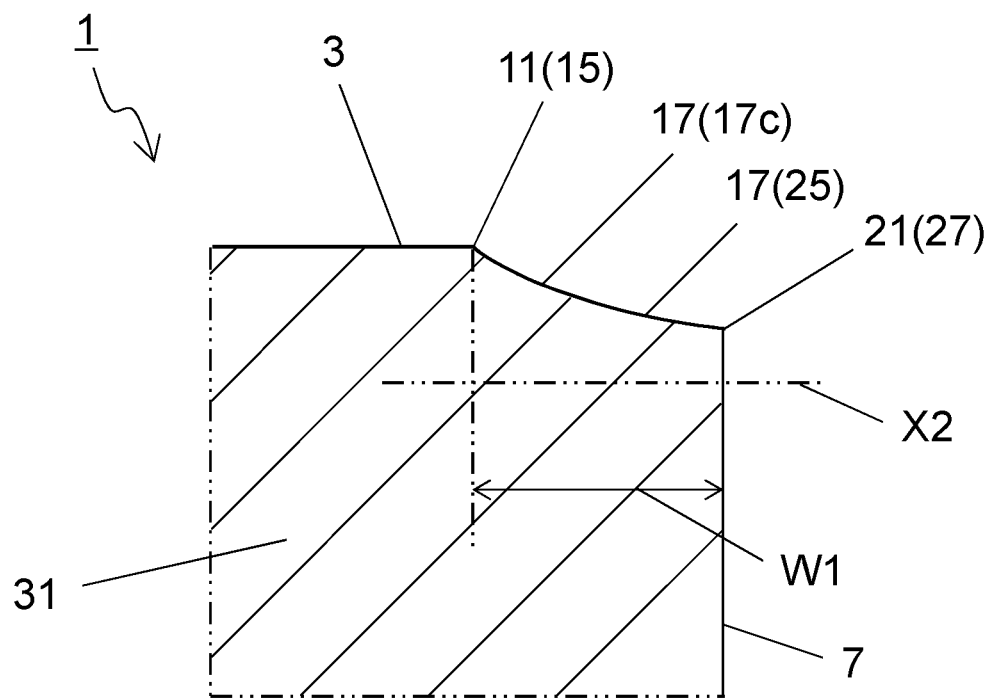
FIG. 12 is a sectional view taken along line XII-XII in the cutting insert illustrated in FIG. 5.

FIGS. 6, 11 and 12 may illustrate sectional views in order to facilitate visual understanding of changes in the first width W1 of the first land surface 17 in the non-limiting embodiment illustrated in FIG. 5. The individual cross-sections may illustrate the first width W1 of the first land surface 17. The W13 illustrated in FIG. 12 may be larger than the W1 illustrated in FIG. 11. The W1 illustrated in FIG. 11 may be larger than the W11 illustrated in FIG. 6.

As apparent from these drawings, the first width W13 at the second end portion 17c may be larger than the first width W11 at the part connecting to the midportion of the first corner 11 in the non-limiting embodiment illustrated in FIG. 5.

A width of the third land surface 25 in the front view as viewed from the side of the first surface 3 may be referred to as a third width W3, the third land surface 25 may include a part where the third width W3 becomes smaller as going away from the first land surface 17. If the third land surface 25 has the above configuration, the insert 1 may have higher durability. In particular, if the third cutting edge 27 is used as a main cutting edge, the main cutting edge subjected to a relatively large cutting load may have enhanced durability.

The third land surface 25 may include both a part where the third width W3 becomes smaller as going away from the first corner 11, and a part where the third width W3 is kept constant in the front view as viewed from the side of the first surface 3.

Figure 13:
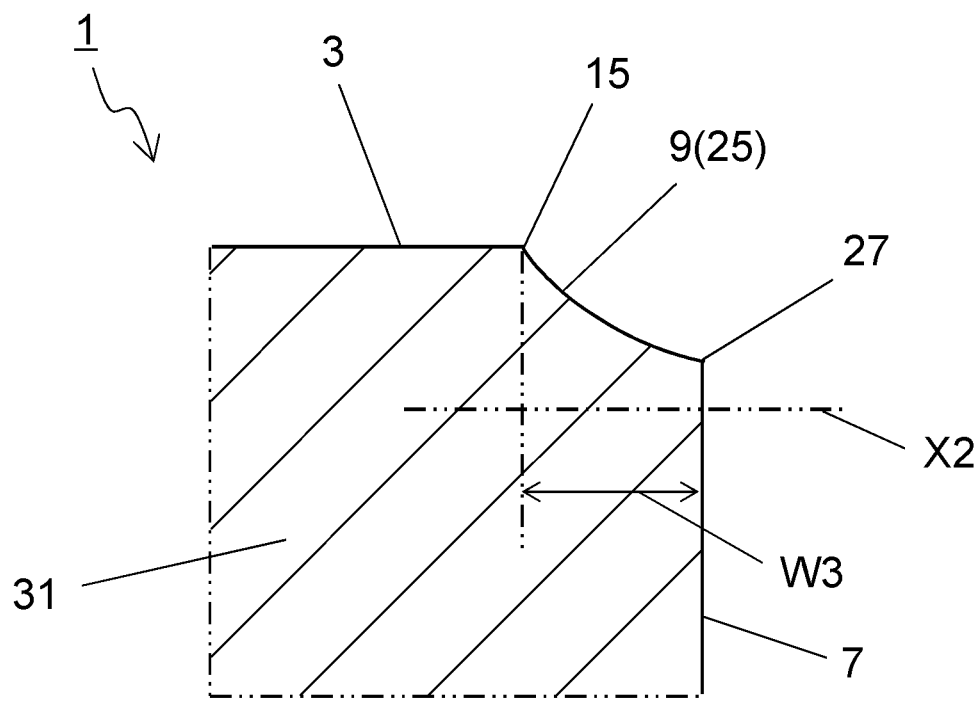
FIG. 13 is a sectional view taken along line XIII-XIII in the cutting insert illustrated in FIG. 5.
Figure 14:
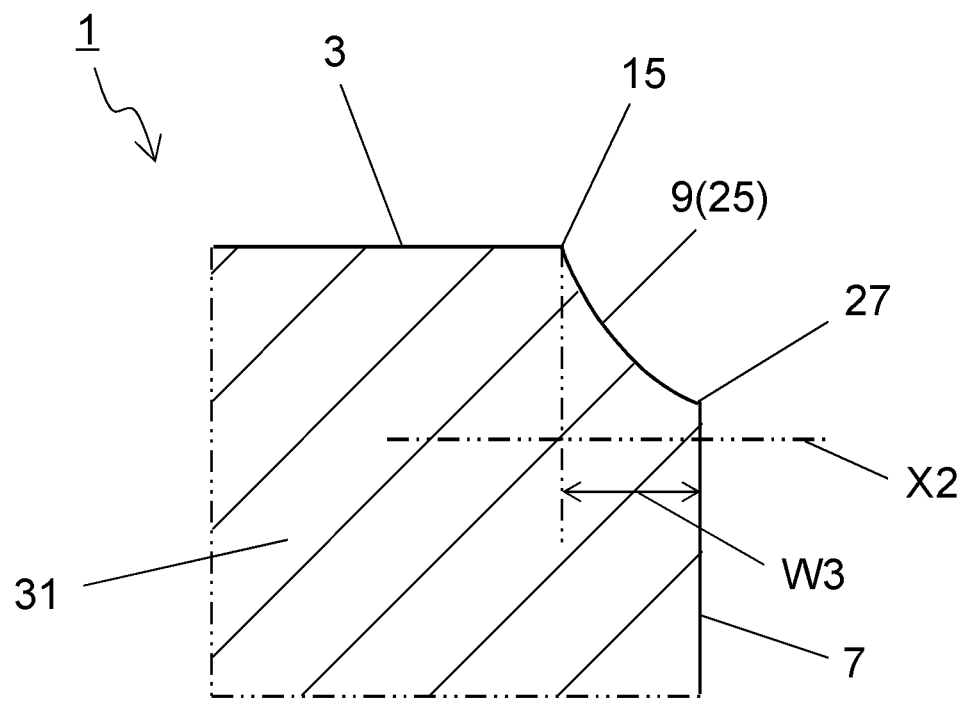
FIG. 14 is a sectional view taken along line XIV-XIV in the cutting insert illustrated in FIG. 5.

FIGS. 12 to 14 may illustrate sectional views in order to facilitate visual understanding of changes in the third width W3 of the third land surface 25 in the non-limiting embodiment illustrated in FIG. 5. The individual cross-sections may illustrate the third width W3 of the third land surface 25. The W3 illustrated in FIG. 12 may be larger than the W3 illustrated in FIG. 13. The W3 illustrated in FIG. 13 may be larger than the W3 illustrated in FIG. 14.

As apparent from these drawings, the third land surface 25 may include a part where the third width W3 becomes smaller as going away from the first land surface 17 in the non-limiting embodiment illustrated in FIG. 5. The cross section illustrated in FIG. 12 may be a cross section on a boundary between the first land surface 17 and the second land surface 19.

A shape of the land surface 9 in a cross section orthogonal to the ridge line where the first surface 3 intersects with the land surface 9 is not limited to a predetermined shape. The shape of the land surface 9 in the cross section may be, for example, a straight line shape or, alternatively, may have a concave shape as in the non-limiting embodiment illustrated in FIGS. 6 to 14. If the first land surface 17 has the concave shape as illustrated in FIGS. 6 to 14, the land surface 9 may have a small inclination angle, and the land surface 9 may have a small width in the front view as viewed from the first surface 3. Consequently, the cutting edge may have higher cutting performance.

Figure 15:
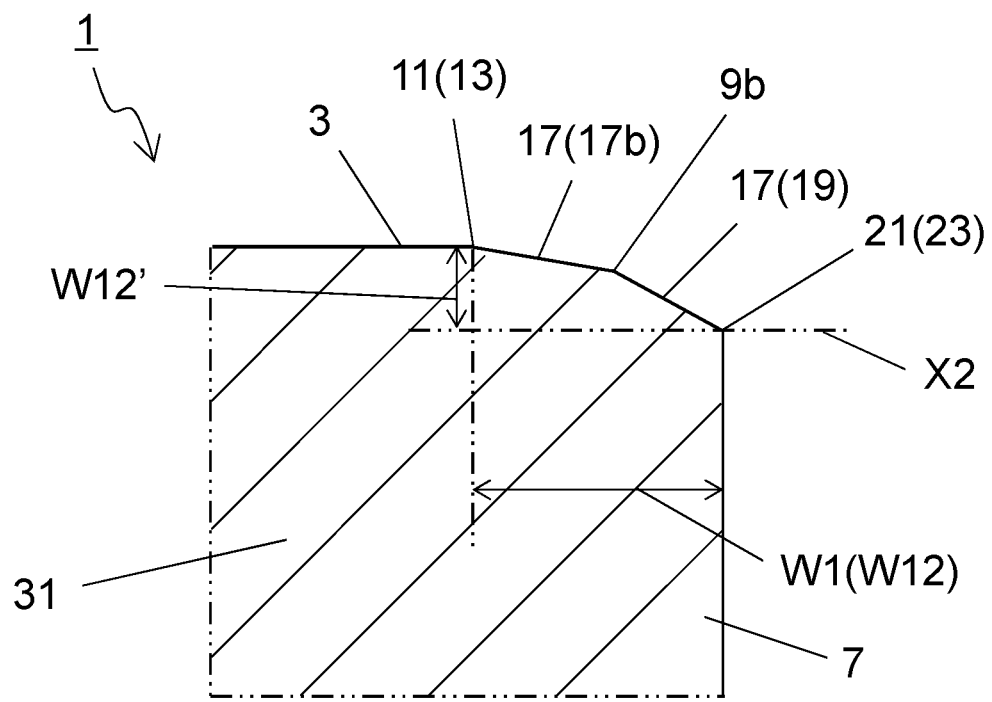
FIG. 15 is a sectional view of another non-limiting embodiment of the cutting insert illustrated in FIG. 7.

The shape of the land surface 9 in the above cross section may include a step 9b as in the non-limiting embodiment illustrated in FIG. 15. If the land surface 9 includes the step 9b as illustrated in FIG. 15, the land surface 9 may have higher durability.

For example, cemented carbide, cermet, ceramics, PCD (polycrystal diamond) and cBN (cubic boron nitride) are usable as a material of the insert 1.

Examples of composition of the cemented carbide may include WC(tungsten carbide)-Co, WC—TiC(titanium carbide)-Co and WC—TiC—TaC(tantalum carbide)-Co. WC, TiC and TaC may be hard particles, and Co may be a binding phase. The cermet may be a sintered composite material obtainable by compositing metal into a ceramic component. Examples of the cermet may include compounds composed mainly of TiC or TiN (titanium nitride). However, it is not intended to limit the material of the insert 1 to these materials.

The insert 1 may include only one member composed of the above illustrated material or, alternatively, may include a plurality of members composed of the above illustrated material.

For example, the insert 1 may include a main body 29 and a cutting part 31, and may have the polygonal plate shape as a whole as illustrated in FIG. 1. The main body 29 may have an approximately polygonal plate shape, part of which is cut away into a concave shape in the non-limiting embodiment illustrated in FIG. 1. The cutting part 31 may be joined to the concave shaped part thus cut away, by using a brazing material or the like.

As in the non-limiting embodiment illustrated in FIG. 1, the first corner 11, the first side 13 and the second side 15 may be located on the cutting part 31. The cutting part 21 may be marked with slant lines in FIG. 1 in order to facilitate visual understanding.

The cutting part 31 may be composed of a material having relatively high hardness, such as PCD and cBN, and the main body 29 may be composed of, for example, cemented carbide, cermet or ceramics. If the main body 21 and the cutting part 23 are individually composed of the above materials, the insert 1 is manufacturable inexpensively. The insert 1 may also have enhanced durability against the cutting load. The hardness of the main body 29 and the cutting part 31 may be evaluated by measuring their respective Vickers hardness.

Although the insert 1 may include only the cutting part 31 and the main body 29, the insert 1 may include, in addition to the cutting part 31 and the main body 29, a coating layer that covers their respective surfaces. The coating layer may entirely or partially cover a surface of a base member composed of the cutting part 31 and the main body 29.

Examples of material of the coating layer may include aluminum oxide (alumina), and carbides, nitrides, oxides, oxocarbon, nitrogen oxides, carbonitrides and carboxynitrides of titanium. The coating layer may include only one or a plurality of the above materials.

The coating layer may be composed of a single layer or a plurality of layers laminated one upon another. The material of the coating layer is not limited to the above materials. The coating layer can be located on the base member by using chemical vapor deposition (CVD) method or physical vapor deposition (PVD) method.

The insert 1 may include a through hole 33 as illustrated in FIG. 1. The through hole 33 may be located from the first surface 3 to the second surface 5 and may open into these surfaces in a non-limiting embodiment. The through hole 33 may be extended along the central axis X1 passing through the center of the first surface 3 and the center of the second surface 5. The through hole 33 may be used for attaching a fixing screw or clamping member when holding the insert 1 in the holder. There is no problem if the through hole 33 is configured to open into regions of the third surface 7 which are located opposite sides.

<Cutting Tool>

A cutting tool 101 in a non-limiting embodiment may be described below with reference to the drawings.

Figure 16:
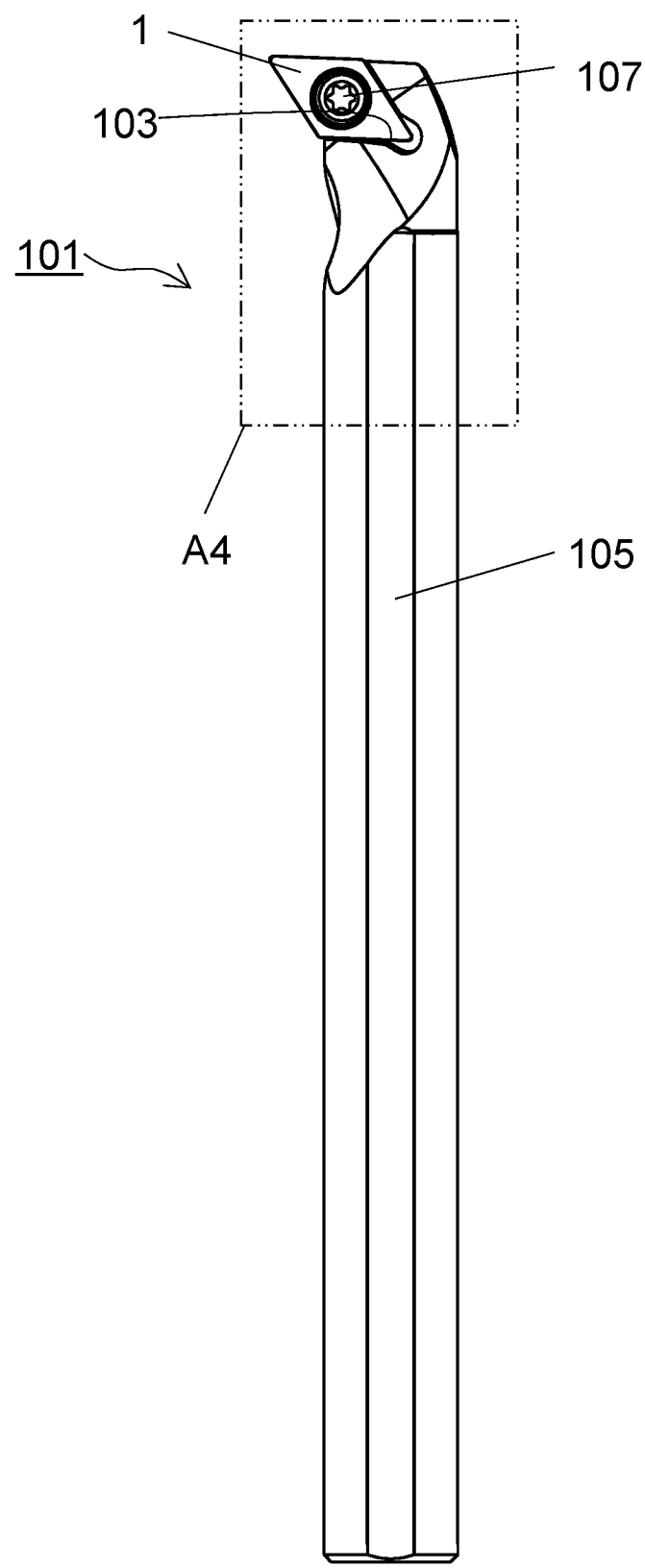
FIG. 16 is a perspective view illustrating a cutting tool in a non-limiting embodiment.
Figure 17:
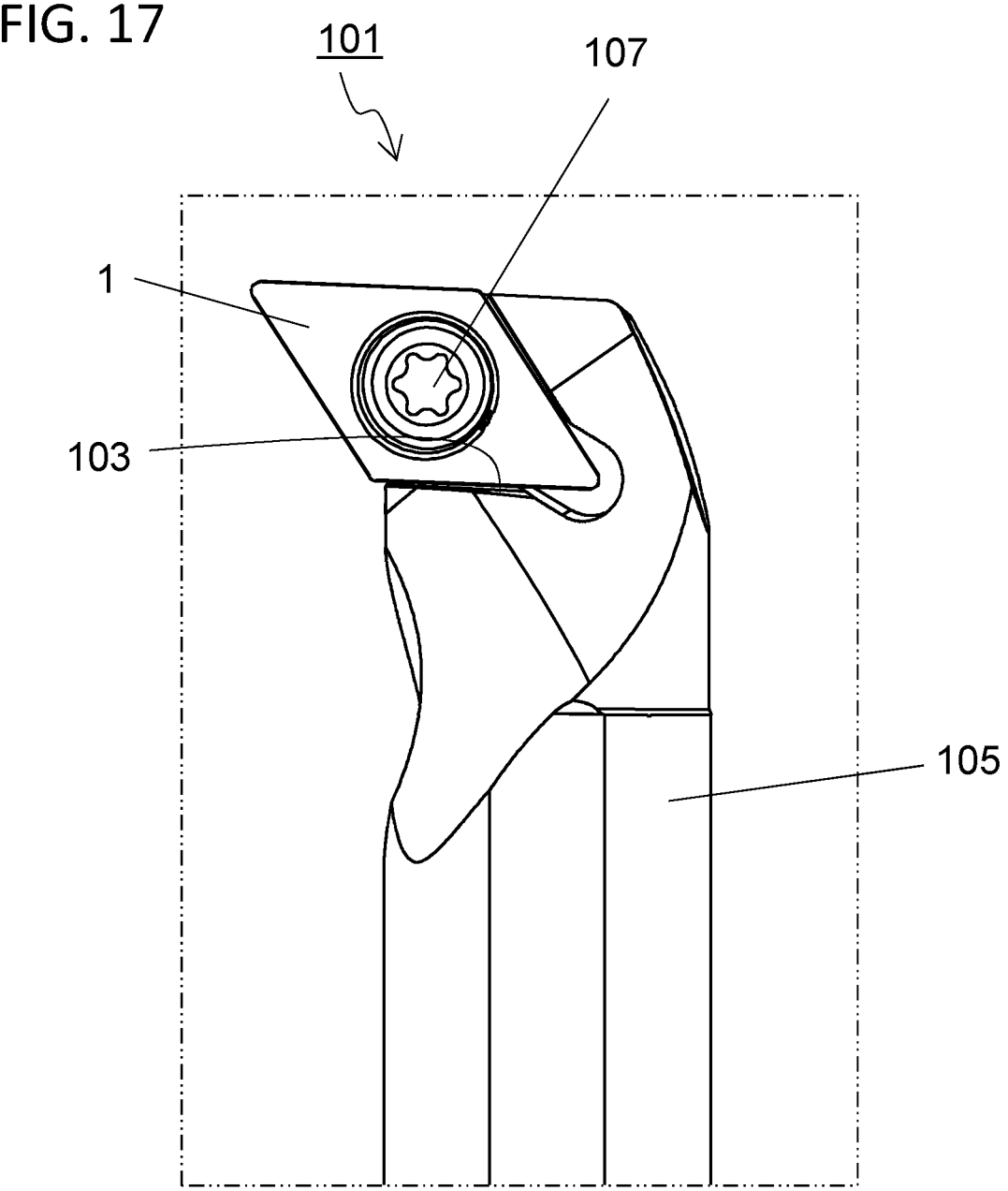
FIG. 17 is an enlarged view of a region A4 illustrated in FIG. 16.

As illustrated in FIGS. 16 and 17, the cutting tool 101 may include a holder 105 with a pocket 103 (insert pocket) at a side of a front end thereof, and the above insert 1 located in the pocket 103 in the non-limiting embodiment. The insert 1 may be attached so that a ridge line may be protruded from the front end of the holder 105 in the cutting tool 101 of the non-limiting embodiment.

The holder 105 may have a bar shape extending narrow and long. The single pocket 103 may be disposed in the side of the front end of the holder 105. The pocket 103 may be a part that permits attachment of the insert 1 and may open into a front end surface of the holder 105. The attachment of the insert 1 can be facilitated because the pocket 103 also opens into a side surface of the holder 105. Specifically, the pocket 103 may include a seating surface parallel to a lower surface of the holder 105, and a constraining side surface inclined relative to the seating surface.

The insert 1 may be located in the pocket 103. The lower surface of the insert 1 may be directly contacted with the pocket 103. Alternatively, a sheet may be held between the insert 1 and the pocket 103.

The insert 1 may be attached so that a part of the ridge line which is usable as the cutting edge may be protruded outward. The insert 1 may be attached to the holder 105 by a fixing screw 107 in the non-limiting embodiment. That is, the insert 1 is attachable to the holder 105 by engagement between screw parts, specifically, by inserting the fixing screw 107 into the through hole of the insert 1, and by inserting a front end of the fixing screw 107 into a screw hole formed in the pocket 103.

Steel or cast iron is usable for the holder 105. Of these materials, the steel may be particularly used from the viewpoint of enhancing toughness of the holder 103.

The non-limiting embodiment may illustrate the cutting tool for use in a so-called turning process.

Examples of the turning process may include inner diameter machining, outer diameter machining and grooving process. The cutting tool is not intended for use only in the turning process. The insert in the above non-limiting embodiment may be used for a cutting tool usable in a milling process.

<Method for Manufacturing Machined Product>

A method for manufacturing a machined product in a non-limiting embodiment may be described below with reference to the drawings.

The machined product is manufacturable by carrying out a cutting process of a workpiece 201. The method for manufacturing a machined product in the non-limiting embodiment may include the following steps:

the step (1) of rotating the workpiece 201;

the step (2) of bringing the ridge line in the cutting tool 101 represented by the foregoing non-limiting embodiments into contact with the workpiece 201 being rotated; and the step (3) of moving the cutting tool 101 away from the workpiece 201.

Figure 18:
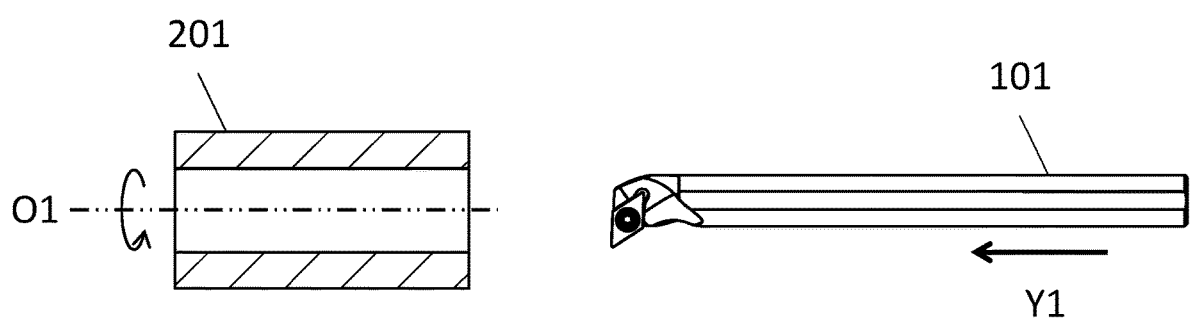
FIG. 18 is a schematic diagram illustrating one of the steps in a method for manufacturing a machined product in a non-limiting embodiment.
Figure 19:
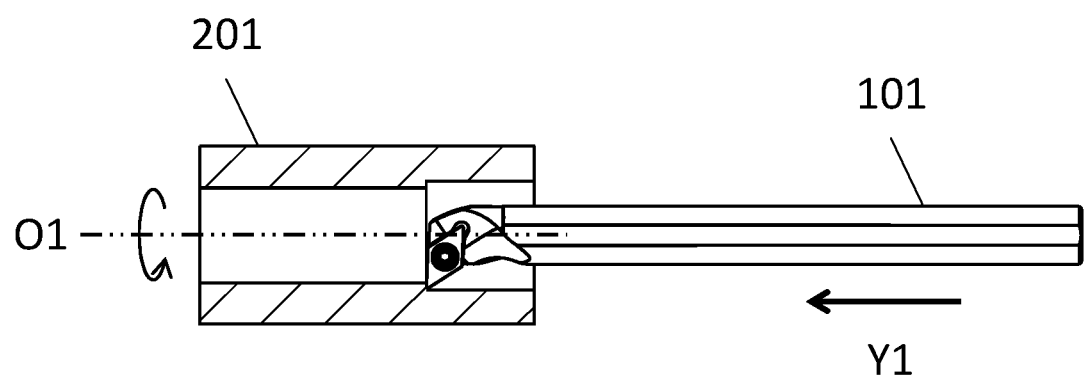
FIG. 19 is a schematic diagram illustrating one of the steps in the method for manufacturing a machined product in the non-limiting embodiment.
Figure 20:
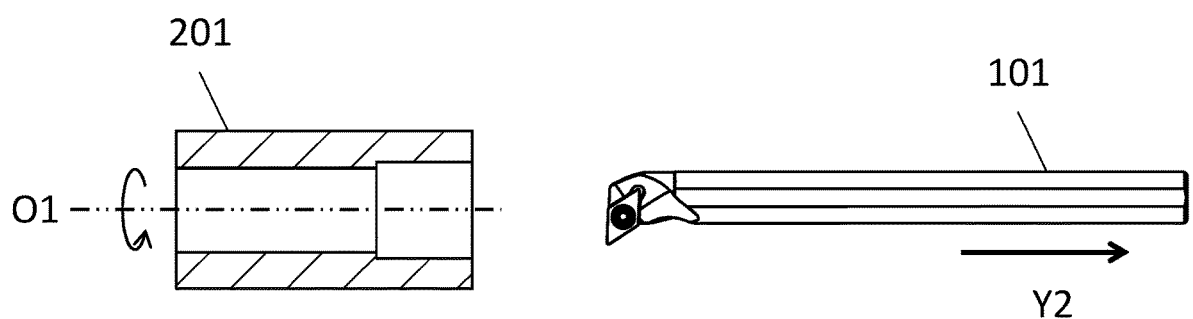
FIG. 20 is a schematic diagram illustrating one of the steps in the method for manufacturing a machined product in the non-limiting embodiment.

More specifically, firstly, the workpiece 201 may be rotated around an axis O1, and the cutting tool 101 may be relatively brought near the workpiece 201 as illustrated in FIG. 18. The workpiece 201 may be then cut out by bringing the ridge line (cutting edge) in the cutting tool 101 into contact with the workpiece 201 as illustrated in FIG. 19. Thereafter, the cutting tool 101 may be relatively moved away from the workpiece 201 as illustrated in FIG. 20.

In a state in which the axis O1 is fixed and the workpiece 201 is rotated, the cutting tool 101 may be brought near the workpiece 201 by moving the cutting tool 101 in Y1 direction in the non-limiting embodiment. In FIG. 19, the workpiece 201 may be cut out by bringing the cutting edge in the cutting insert into contact with the workpiece 201 being rotated. In FIG. 20, the cutting tool 101 may be moved away by moving the cutting tool 101 in Y2 direction in a state in which the workpiece 201 is rotated.

Although the cutting tool 101 is brought into contact with the workpiece 201, or the cutting tool 101 is moved away from the workpiece 201 in the individual steps during the cutting process using the manufacturing method in the non-limiting embodiment, it is, of course, not intended to be limited to the above non-limiting embodiment.

For example, the workpiece 201 may be brought near the cutting tool 101 in the step (1). Similarly, the workpiece 201 may be moved away from the cutting tool 101 in the step (3). If desired to continue the cutting process, the step of bringing the cutting edge in the insert 1 into contact with different portions of the workpiece 201 may be repeated while keeping the workpiece 201 rotated.

Representative examples of material of the workpiece 201 may include carbon steel, alloy steel, stainless steel, cast iron and nonferrous metals.

DESCRIPTION OF THE REFERENCE NUMERALS 1 cutting insert (insert)
3 first surface
5 second surface
7 third surface
9 land surface
11 first corner
13 first side
15 second side
17 first land part
17a midportion
17b first end portion
17c second end portion
19 second land surface
21 first cutting edge
23 second cutting edge
25 third land surface
27 third cutting edge
29 main body
31 cutting part
33 through hole
101 cutting tool
103 pocket
105 holder
107 fixing screw
201 workpiece

What is claimed is:

1. A cutting insert, comprising:
a first surface having a polygonal shape and comprising a first corner and a first side extended from the first corner;
a second surface located on a side opposite to the first surface;
a third surface located between the first surface and the second surface; and
a land surface located between the first surface and the third surface, wherein
the land surface comprises:
a first land surface connecting to the first corner, and
a second land surface connecting to the first side and abutting the first land surface;
the first land surface comprises:
a midportion, and
a first end portion located at a side of the second land surface;

the first land surface has a first width in a front view of the first surface;

the first width at the first end portion is larger than the first width at the midportion;

the first land surface has a first height in a side view of the first land surface;

the first height at the midportion is larger than the first height at the first end portion;

the second land surface has a second width in the front view of the first surface;

the second land surface comprises a part where the second width becomes smaller going away from the first land surface and a part where the second width is constant, or the second width only becomes smaller going away form the first land surface;

a ridge line where the first surface intersects with the first land surface is a convex curvilinear arc in which a second radius of curvature at the midportion of the first land surface is smaller than a third radius of curvature at the first end portion in the front view of the first surface;

the ridge line where the first surface intersects with the first land surface and the second land surface is without a concave section;

the first surface further comprises a second side extending from the first corner;

the land surface further comprises a third land surface connecting to the second side;

the first land surface further comprises a second end portion located at a side of the third land surface; and the first width at the second end portion is larger than the first width at the midportion.

2. The cutting insert according to claim 1, wherein the first land surface further comprises a part where the first width becomes larger approaching the first end portion from the midportion in the front view of the first surface.

3. The cutting insert according to claim 1, wherein a ridge line where the third surface intersects with the first land surface has a circular arc shape in which a first radius of curvature is constant in the front view of the first surface.

4. The cutting insert according to claim 1, wherein the third land surface has a third width in the front view of the first surface, and the third land surface comprises a part where the third width becomes smaller going away from the first land surface.

5. A cutting tool, comprising:
a holder comprising a pocket located on a side of a front end of the holder; and
the cutting insert according to claim 1, the cutting insert being located in the pocket.

6. A method for manufacturing a machined product, comprising:
rotating a workpiece;
bringing the cutting tool according to claim 5 into contact with the workpiece being rotated; and
moving the cutting tool away from the workpiece.

* * * * *